UNITED STATES PATENT OFFICE.

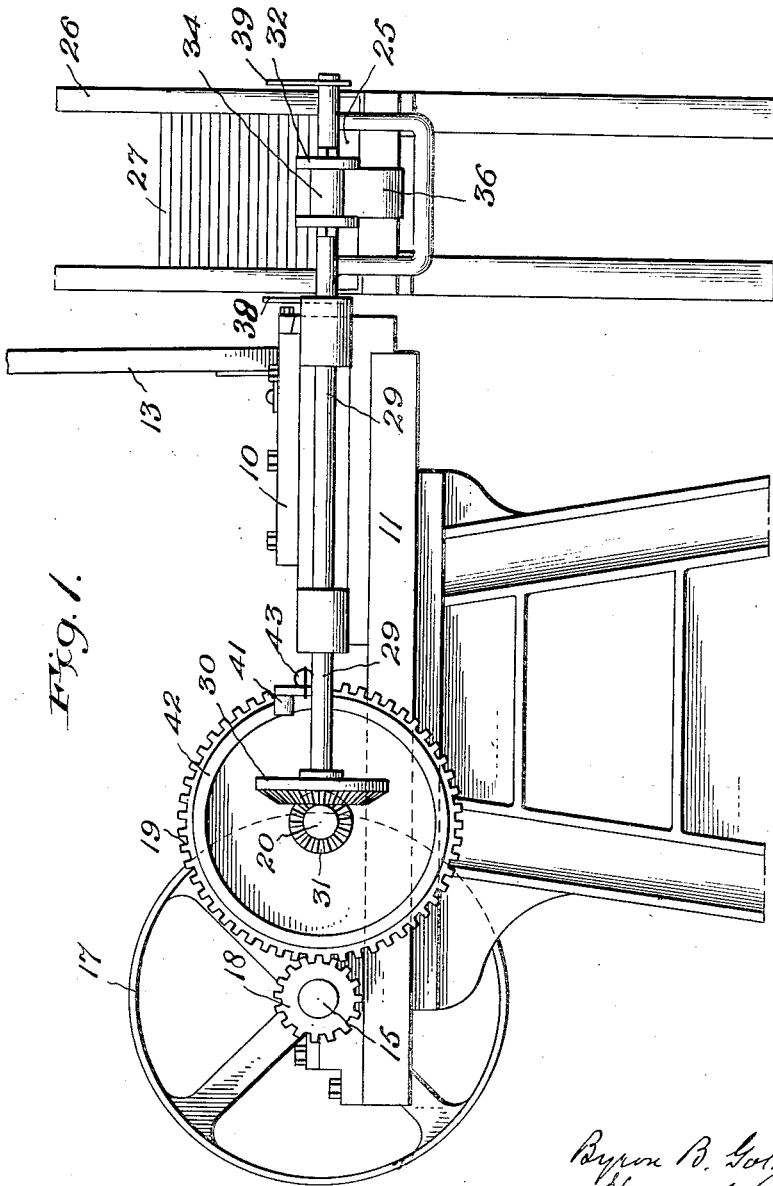

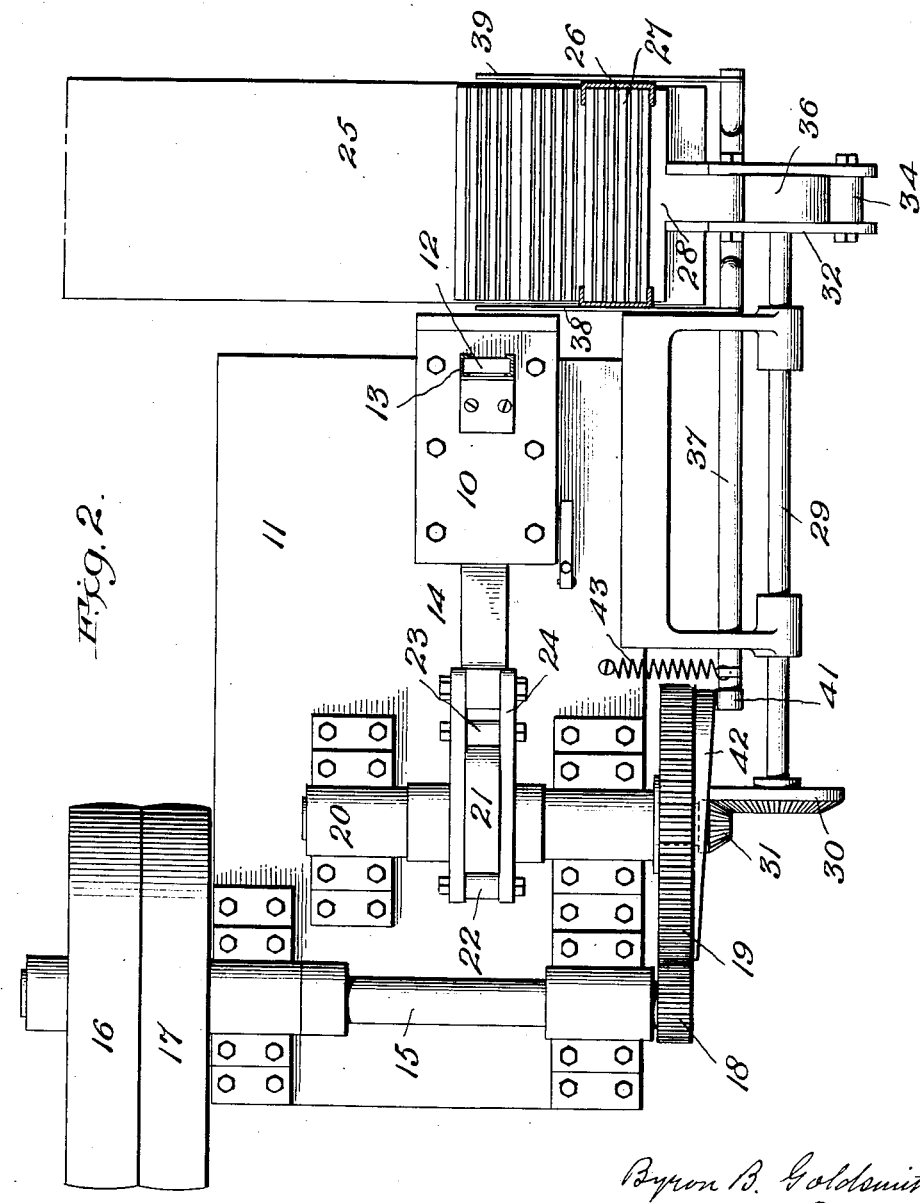

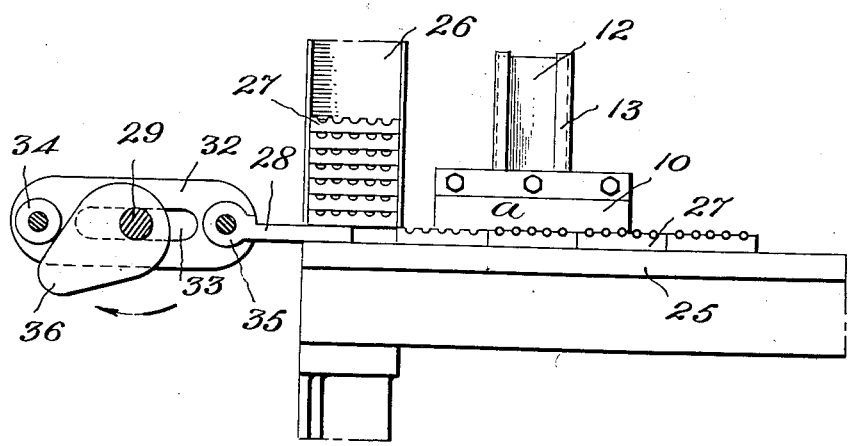
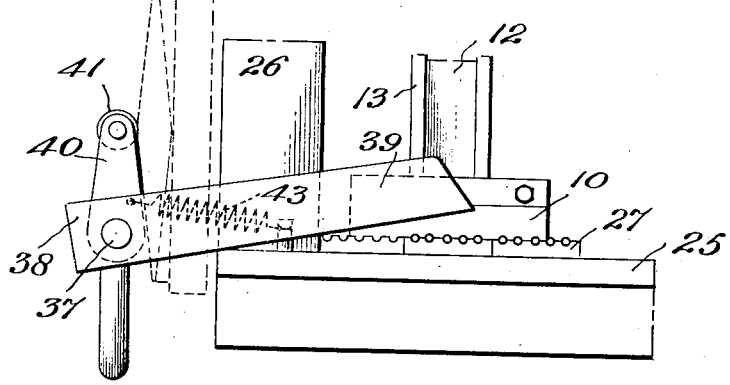
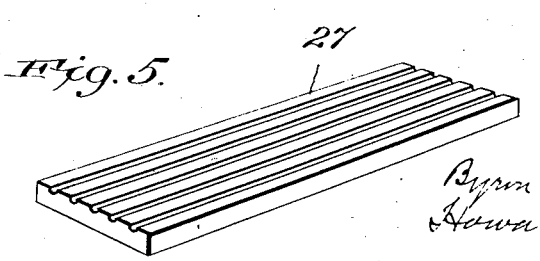

BYRON B. GOLDSMITH, OF NEW YORK, N. Y., AND HOWARD BARKER, OF HOBOKEN, NEW JERSEY, ASSIGNORS TO AMERICAN LEAD PENCIL COMPANY, A CORPORATION OF NEW YORK.

PROCESS AND APPARATUS OF FORMING RODS FROM PLASTIC MATERIAL.

1,362,093.      Specification of Letters Patent.     Patented Dec. 14, 1920.

Application filed May 2, 1918. Serial No. 232,144.

*To all whom it may concern:*

Be it known that we, BYRON B. GOLDSMITH and HOWARD BARKER, citizens of the United States, residing at New York, in the county and State of New York, and at Hoboken, in the county of Hudson and State of New Jersey, respectively, have invented certain new and useful Improvements in Processes and Apparatus of Forming Rods from Plastic Material; and we do hereby declare the following to be a clear, full, and exact description of the invention, such as will enable others skilled in the art to which it appertains to make and use same.

Our present invention relates to an improved process and apparatus for the manufacture of rods and tubes from plastic material, and more particularly to the method and means employed in forming, cutting off and charging of the plastic rods upon racks preparatory to drying them.

In various arts, as, for instance, in the manufacture of leads for pencils, it becomes necessary to convert a formless mass of plastic material, such as a mixture of clay and graphite with water, into straight hard rods of a definite length.

Hitherto it has been customary to accomplish this by first squeezing the plastic material through a formative orifice in the wall of a suitable container, thereby producing a rod or strand of indefinite length which is continuously discharged from the container. In order to be able to handle this continuous strand, the operator guides it into a circular pan, and allows it to build up a circular coil until the pan is full, when another operator unwinds it, and, breaking off pieces of suitable length, lays these lengths on a board provided with grooves, into which they fit. When the board is full the lead is covered by any suitable means to keep it down in drying, and the boards are set aside to permit the leads to dry. This drying is accomplished either at ordinary temperature or by means of artificial heat in dry rooms. It takes a number of days for this lead to dry at the ordinary temperature, and about two days when artificial heat is applied. This process involves a number of obvious disadvantages which it is the object of our present invention to avoid.

One disadvantage of the process above described is that the long, continuously formed wire-like structure which is expressed from the container, being extremely plastic, forms many kinks in handling, which kinks must be broken out and reworked. In addition to this, there are many elevations and depressions formed which are hardly visible, but which increase in drying and show only on the dried lead, thus making it practically impossible to get straight lead by the old method, where the strand has to be handled by the operators. Another disadvantage of the old process is due to the fact that the strand is very weak and fragile, and no matter how careful the handling, there is consderable loss from breakage. This breakage not only occurs in placing the lead in the grooves, but in taking the dried lead out of them. These operations have heretofore all been done by hand, involving much time and requiring very skilled service, with the consequent high expense.

With a view to obviating these difficulties, our invention, in its preferred form, involves discharging each plastic rod to be dried directly upon the carrier intended to support it while it is drying, and cutting each rod to the proper approximate length as it is so discharged and deposited. The carrier may be one of the kind already mentioned herein as in common use, or it may be of any suitable construction. The rods are preferably formed intermittently and in groups rather than singly, but these details are not absolutely essential to the invention. It is immaterial whether the rods are formed solid or hollow, and therefore it is to be understood that the term "rods" as used in our claims is intended to cover tubes or hollow rods.

We have illustrated a preferred form of our invention in the accompanying drawings, wherein Figure 1 is a side elevation of the apparatus, Fig. 2 is a plan view of the same, Fig. 3 is a partial front elevation showing the automatic carrier-feeding means, Fig. 4 is a similar view of the cutting device, and Fig. 5 is a perspective view of the usual carrier, as used in the preferred apparatus illustrated.

The compression chamber may be of any desired construction, but we prefer the form shown wherein a horizontally placed rectangular box 10 is supported on a suitable table 11. The front wall is pierced, preferably with five openings shown at $a$ in Fig. 3, through which the material is expressed as hereinafter described. A long thick ribbon 12 of plastic material is confined between guides 13, and passes by gravity into a chamber within the box 10. Here the bottom portion of the ribbon is pressed forward intermittently by means of the reciprocating plunger 14, the material being divided and pressed forward through the five openings shown at $a$.

Although we find it convenient to use a ribbon or pre-formed blank made of plastic material, this is not essential to our invention, as with a suitable hopper the material can be fed to the compression box in pieces of any size or even in the form of moist powder.

Any suitable means may be used for imparting motion to the plunger, and we have shown a simple arrangement for this purpose in Figs. 1 and 2. Here the main driving shaft 15 is furnished with the usual fast and loose pulleys 16, 17, and carries the pinion 18 at its opposite end. This pinion drives the gear wheel 19 on the shaft 20 carrying the eccentric 21. This eccentric bears upon the opposed rollers 22, 23, carried by the frame 24, attached to the rear of the plunger 14, to which there is thus imparted a reciprocating motion in a well known manner.

The means for expressing the plastic rods is preferably combined with one or more movable carriers and means whereby such carrier or carriers are moved across the front of the forming element. In our drawings, we have shown means whereby the usual well known grooved carrier blocks may be used. A transverse table 25 extends in front of the compression box 10, and at one side is erected a guideway 26 into which the grooved carriers 27 are fitted and piled one on the other. Openings are provided on opposite sides at the bottom of the guideway 26, and are made just large enough easily to afford passage to a single carrier 27 at a time.

In order to cause the carriers to move in a continuous procession past the formative orifices at $a$, we employ a pusher 28 which is given an automatic reciprocating movement so timed that, as soon as a carrier receives the plastic rods from the box 10, a new carrier is pushed forward out of the guideway 26, thus causing the whole line of advanced carriers to move along the table 25 toward the right in Fig. 3. This brings a new carrier in front of the orifices at $a$, ready to be charged on the next advance of the plunger 14.

One of many possible means for imparting the desired automatic movement to the pusher 28 is shown in our drawings. A cam shaft 29 is driven by the beveled gear 30, which meshes with a beveled pinion 31, on the shaft 20. Directly back of the pusher 28, and pivotally attached thereto, is a frame 32 having a slot 33 which fits the shaft 29 as shown in Fig. 3. This frame carries suitable rounded abutments 34, 35, between which works the cam 36, fast on the shaft 29. As this cam revolves in the direction of the arrow in Fig. 3, it imparts the properly timed movement above described to the pusher 28.

In order to sever the plastic material after it is laid upon its carrier we may employ automatic cutting means of any suitable construction. In the preferred form shown, we employ a rocking shaft 37, to which is fixed a knife 38, adapted to swing across the path of movement of the plastic material so as to cut it off between the box 10 and the carrier 27. A second knife 39 may be used to cut off at the same time any superfluous length of material at the outer end of the carrier. The requisite rocking movement is imparted to the shaft 37 by an arm 40 carrying a pin or roller 41 which is kept in constant operative contact with a cam 42 on the face of the gear 19 by a spring 43. This cam is so shaped as to impart a properly timed movement to the cutting apparatus, in a well known manner.

Our invention includes certain operations performed upon the material treated, independently of the form of apparatus employed, and these are covered by our process claims. It is also to be understood that various changes may be made in our apparatus without departing from the scope of our apparatus claims, and that we do not limit ourselves to the details herein shown and described.

What we claim is—

1. In the process of making rods from plastic material, expressing the material through a formative orifice, delivering the same automatically in sections of suitable length to a carrier adapted to support and confine said sections, and drying said sections under confinement in the carrier to which they are delivered.

2. In the process of making rods from plastic material, expressing the material through a formative orifice, delivering the same automatically in sections of suitable length to an intermittently moving carrier adapted to support and confine said sections, and drying said sections under confinement in the carrier to which they are delivered.

3. In the process of making rods from plastic material, expressing the material through a formative orifice by intermittent movements to form sections of suitable length, delivering the same automatically upon carriers adapted to confine them, severing the sections between the carriers and the forming means, and drying them on said carriers.

4. In the process of making rods from plastic material, forming successive groups of plastic rods by intermittent pressure, receiving them as formed on intermittently moving carriers severing each group immediately after its formation, and drying them on said carriers.

5. In the process of making rods from plastic material, forming a blank of the plastic material and squeezing successive portions thereof through a suitable formative orifice.

6. In the process of making rods from plastic material, forming a blank of the plastic material and squeezing successive portions thereof through a group of contiguous orifices.

7. In the process of making rods from plastic material, forming a blank of the plastic material, squeezing successive portions thereof through a formative orifice, receiving such portions on a carrier, and severing them between said orifices and carrier.

8. In the process of making rods of plastic material, advancing a pre-formed blank made of such material intermittently, and expressing successive portions thereof through a restricted opening, in a direction transverse to the direction of such advance.

9. Apparatus for the purpose described comprising a compression chamber supplied with a formative orifice, a carrier adapted to receive and confine rods to be dried, means adapted to express plastic material through said orifice and deliver the same automatically to said carrier, and automatic severing means operatively connected with said expressing means.

10. The elements set forth generally in claim 9 hereof in combination with means for intermittent operation of the expressing means.

11. The elements set forth generally in claim 9 hereof in combination with automatic means for moving the carrier across the path of the expressed material.

12. The combination set forth generally in claim 11 hereof wherein the movements of the carrier and of the expressing means are made intermittent.

13. Apparatus of the class described comprising a compression chamber with a formative orifice, an expressing device, means for producing intermittent movement of said expressing device, a number of carriers adapted to receive the expressed material, and means adapted to feed said carriers successively across the path of movement of the expressed material.

14. The combination generally set forth in claim 13 hereof, wherein the carrier feeding means comprises a support, a guideway thereon, a series of separate carriers piled in said guideway, a pusher adapted to eject said carriers from the guideway along said support and automatic means for actuating said pusher in proper time relation to the expressing means.

15. The combination generally set forth in claim 13 hereof wherein a plurality of formative orifices are employed and wherein the carriers comprise blocks having grooves like in number to said orifices and similarly placed, whereby the rods, as they are expressed, are received in said grooves.

16. The elements set forth in claim 13 hereof in combination with automatic severing means between said chamber and carriers.

17. The combination generally set forth in claim 16 hereof, wherein the severing means comprises an intermittently moving knife blade.

18. Apparatus for the purpose described comprising a compression chamber supplied with a formative orifice, means for expressing plastic material through said orifice, a carrier for drying the expressed material provided with a groove for receiving said material, and means for insuring alinement of said groove in front of said orifice.

19. Apparatus of the character set forth in claim 18 hereof, wherein automatic severing means are employed directly in front of said formative orifice.

20. Apparatus for the purpose described comprising a formative chamber, means for expressing plastic material therefrom, means for intermittently operating said expressing means, a carrier for receiving the expressed material, and automatic means for causing intermittent movement of said carrier past said formative chamber during the intervals between the operative movements of said expressing means.

21. Apparatus for the purpose described comprising a formative chamber having formative orifices at its forward end, a plunger adapted to move in said chamber, a driving shaft for said plunger, means for feeding carriers in front of said chamber, and gearing between said plunger and carrier feeding means for operating the latter intermittently.

22. Apparatus of the character set forth in claim 21 hereof, in combination with severing means in front of the formative chamber, a cam carried by the driving shaft of the plunger, and means actuated by said cam for operating said severing means.

23. The process of manufacturing rods from plastic material, which consists in expressing the material through one or more formative orifices to form plastic rods, delivering the same automatically to carriers adapted to confine the rods when placed one on the other, severing the rods between the carriers and the expresing means, and drying the rods while confined between carriers.

In testimony whereof, we affix our signatures.

BYRON B. GOLDSMITH.
HOWARD BARKER.